United States Patent
Lee

(10) Patent No.: US 9,462,229 B2
(45) Date of Patent: Oct. 4, 2016

(54) METHOD FOR EXTENDING PARTICIPANTS OF MULTIPARTY VIDEO CONFERENCE SERVICE

(71) Applicant: SAMSUNG SDS CO., LTD., Seoul (KR)

(72) Inventor: Geun Jae Lee, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 0 days.

(21) Appl. No.: 14/588,076

(22) Filed: Dec. 31, 2014

(65) Prior Publication Data
US 2016/0065898 A1    Mar. 3, 2016

(30) Foreign Application Priority Data

Aug. 28, 2014 (KR) .................. 10-2014-0113318

(51) Int. Cl.
*H04N 7/15*    (2006.01)
(52) U.S. Cl.
CPC .................... *H04N 7/152* (2013.01)
(58) Field of Classification Search
CPC .................................................. H04N 7/152
USPC .............. 340/12.5; 348/14.03, 14.08, 14.09; 370/352, 356, 401, 503; 379/265.01; 700/94; 704/251; 709/204, 207, 225
See application file for complete search history.

(56) References Cited

U.S. PATENT DOCUMENTS

| | | | |
|---|---|---|---|
| 6,418,125 B1 | 7/2002 | Oran | |
| 6,457,043 B1 * | 9/2002 | Kwak | H04L 12/1822 709/202 |
| 6,574,331 B1 * | 6/2003 | Forsythe | H04L 12/66 379/265.01 |
| 6,704,769 B1 * | 3/2004 | Comstock | H04N 7/147 348/E7.081 |
| 7,289,493 B1 * | 10/2007 | Vera | H04M 7/0057 370/352 |

(Continued)

FOREIGN PATENT DOCUMENTS

| | | |
|---|---|---|
| JP | 2005057402 A | 3/2005 |
| JP | 2012203122 A | 10/2012 |

(Continued)

OTHER PUBLICATIONS

ISR (PCT/ISA/210) issued May 7, 2015, in related International Application No. PCT/KR2014/009790.

(Continued)

*Primary Examiner* — Gerald Gauthier
(74) *Attorney, Agent, or Firm* — Sughrue Mion, PLLC

(57) ABSTRACT

Provided is a method of extending participants of a multilateral video conference service. The method includes: receiving, by a multipoint conference unit (MCU) gateway connected with an MCU through at least one physical port and connected with a plurality of terminals in a wired or wireless manner, information on a signal level of sound sensed by microphones provided in plurality of terminal devices from plurality of terminal devices, respectively, selecting, by MCU gateway, one terminal device among plurality of terminal devices as a speaking terminal device based on the received signal level, requesting, by MCU gateway, speaking terminal device to transmit speaking contents input into speaking terminal device and transmitting, by the MCU gateway, speaking contents received from speaking terminal device in response to transmission request to the MCU through at least one physical port.

15 Claims, 7 Drawing Sheets

(56) References Cited

U.S. PATENT DOCUMENTS

| | | | | |
|---|---|---|---|---|
| 7,353,251 | B1* | 4/2008 | Balakrishnan | H04L 12/1818 709/204 |
| 7,707,262 | B1* | 4/2010 | Bill | G06Q 10/00 709/204 |
| 8,456,510 | B2* | 6/2013 | King | H04N 7/152 348/14.08 |
| 8,514,265 | B2* | 8/2013 | Goyal | H04N 7/147 348/14.09 |
| 8,643,695 | B2* | 2/2014 | King | H04N 7/152 348/14.08 |
| 8,824,487 | B1* | 9/2014 | Ray | H04L 65/102 370/401 |
| 9,167,098 | B1* | 10/2015 | Anderson | H04L 12/1827 |
| 9,210,381 | B2* | 12/2015 | Yang | H04N 7/152 |
| 2002/0095498 | A1* | 7/2002 | Chanda | H04L 12/2889 709/225 |
| 2002/0141392 | A1 | 10/2002 | Tezuka et al. | |
| 2007/0115928 | A1* | 5/2007 | Benco | H04M 3/42042 370/352 |
| 2008/0172232 | A1* | 7/2008 | Gurley | G08B 1/08 704/251 |
| 2012/0310395 | A1* | 12/2012 | El-Hoiydi | H04W 48/16 700/94 |
| 2014/0118120 | A1* | 5/2014 | Chen | G08C 17/02 340/12.5 |
| 2015/0296179 | A1* | 10/2015 | Usbergo | H04N 7/15 348/14.03 |
| 2016/0065898 | A1* | 3/2016 | Lee | H04N 7/152 348/14.09 |

FOREIGN PATENT DOCUMENTS

| | | |
|---|---|---|
| KR | 1019970032095 A | 6/1997 |
| KR | 100498291 B1 | 7/2005 |
| KR | 1020050095280 A | 9/2005 |
| KR | 10-2010-0107697 A | 10/2010 |

OTHER PUBLICATIONS

Communication dated Jun. 18, 2016, issued by the Korean Intellectual Property Office in counterpart Korean Application No. 10-2014-0113318.

* cited by examiner

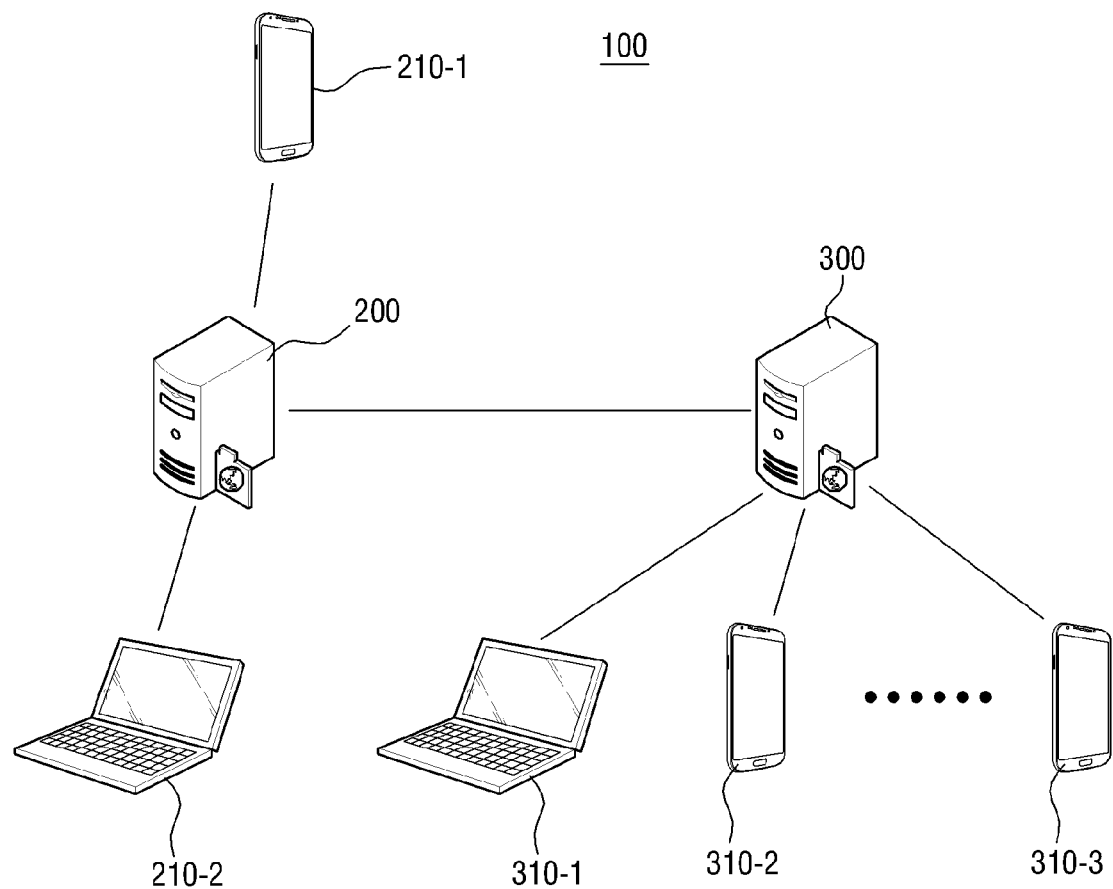

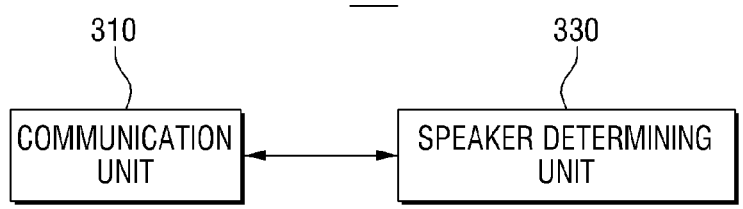
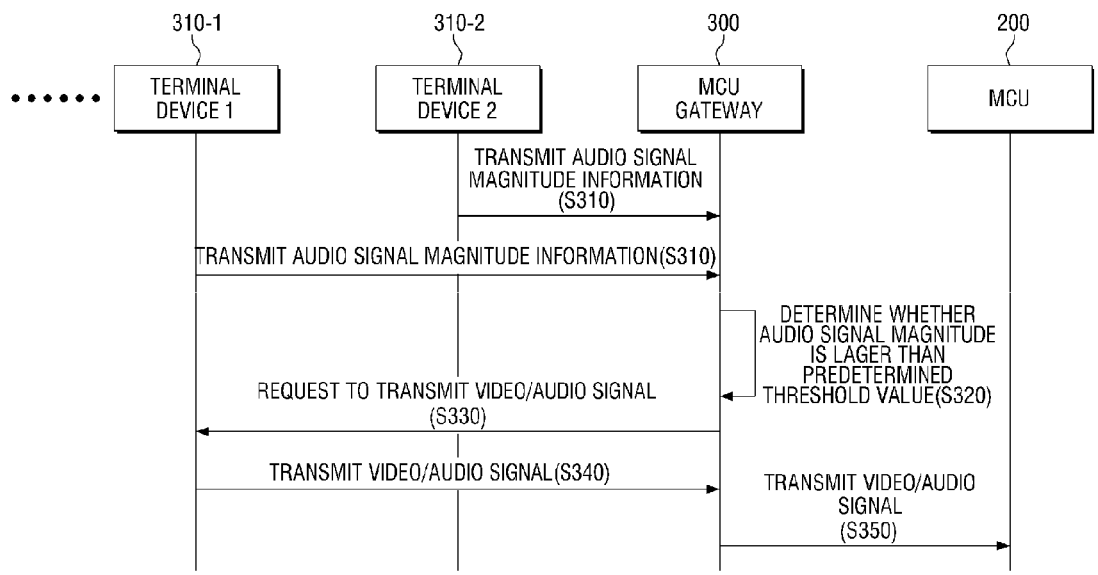

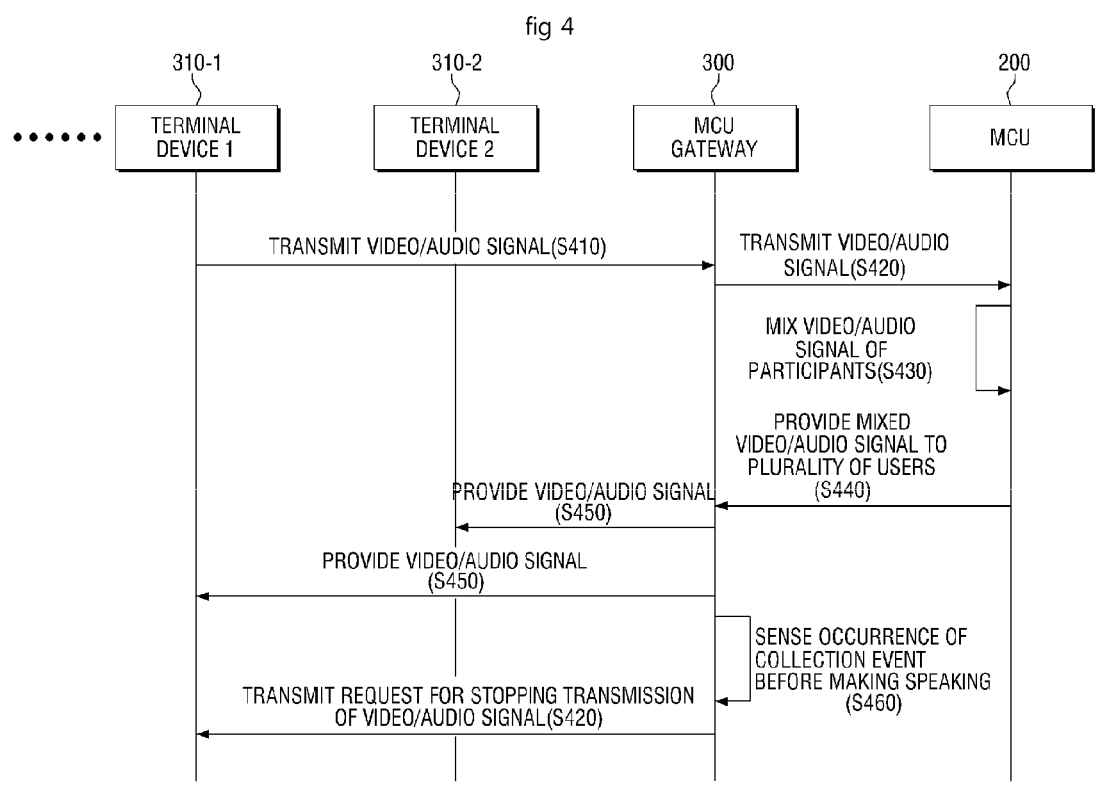

fig 5
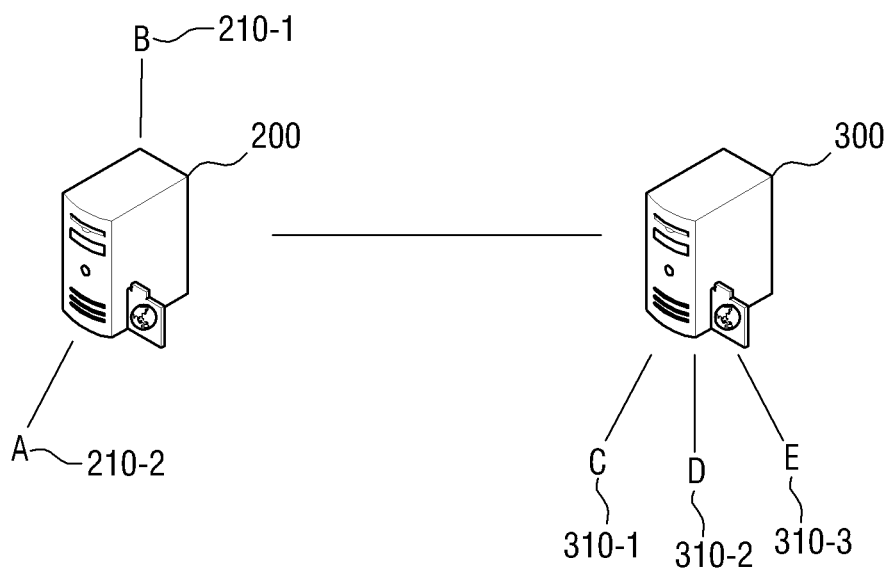

900

METHOD FOR EXTENDING PARTICIPANTS OF MULTIPARTY VIDEO CONFERENCE SERVICE

CROSS-REFERENCE TO RELATED APPLICATION

This application claims priority from Korean Patent Application No. 10-2014-0113318 filed on Aug. 28, 2014 in the Korean Intellectual Property Office, and all the benefits accruing therefrom under 35 U.S.C. 119, the contents of which in its entirety are herein incorporated by reference.

TECHNICAL FIELD

The present invention relates to a method for extending participants of a multilateral video conference service, and more particularly, to a method for extending participants of a multilateral video conference service that can extend the number of participants of the video conference without installing additional equipment of a multi-point control unit (MCU).

BACKGROUND

A multi-point control unit (MCU) is a device used to perform a multilateral video conference. The MCU serves to simultaneously receive video or audio streams from a plurality of participants and mix the received video or audio streams with one audio/video and provide the mixed audio/video to a conference participant.

In this case, the MCU allocates a port to a participant who intends to participate in a video conference and receives a video signal or an audio signal from a terminal device of the participant connected to the corresponding port. However, since the MCU includes only a limited number of ports, there is a problem that an expensive MCU needs to be additionally installed in order to extend the number of conference participants.

Generally, since one MCU includes 16 to 60 ports, when the number of participants is larger than that of the ports, more MCUs are required to secure the ports corresponding thereto.

Therefore, there is a need for a method for extending participants of a multilateral video conference service, which allows more participants to participate in the conference without additional installation of the MCU.

SUMMARY

The present invention has been made in an effort to provide a method for extending participants of a multilateral video conference service, which allows users which are more than ports provided in an MCU to participate in a video conference without additional installation of the MCU which is expensive equipment.

The present invention has also been made in an effort to display only a video signal of a speaker who speaks in the video conference to other conference participants to prevent a network resource from being unnecessarily used.

The present invention has also been made in an effort to provide a video conference system that can support a video conference system at low cost for large-scale users without interworking with the existing MCU or without a MCU.

According to the embodiments of the present invention, the users which are more than the ports provided in the MCU are allowed to participate in the conference without additional installation of the MCU which is the expensive equipment.

A video signal is received from a speaker having a speaking right and displayed to other participants to minimize an unnecessary network resource.

In addition, the video conference system that allows a plurality of user to participate in the conference without interworking with the existing MCU can be provided.

The technical objects of the present invention are not limited to the aforementioned technical objects, and other technical objects, which are not mentioned above, will be apparent to those skilled in the art from the following description.

BRIEF DESCRIPTION OF THE DRAWINGS

The above and other features and advantages of the present invention will become more apparent by describing in detail embodiments thereof with reference to the attached drawings in which:

FIG. 1 is a diagram for describing a video conference system 100 according to an embodiment of the present invention;

FIG. 2 is a block diagram of an MCU gateway 300 according to the embodiment of the present invention;

FIG. 3 is a signal flowchart for describing a method for extending participants of a multilateral video conference service according to another embodiment of the present invention;

FIG. 4 is a signal flowchart for describing a process of withdrawing selection of a speaking terminal device in the method for extending participants of a multilateral video conference service according to the embodiment of the present invention;

FIG. 5 is a diagram for describing a state in which speaking contents are provided to conference participants according to the embodiment of the present invention;

DETAILED DESCRIPTION OF THE EMBODIMENTS

Figure 6:
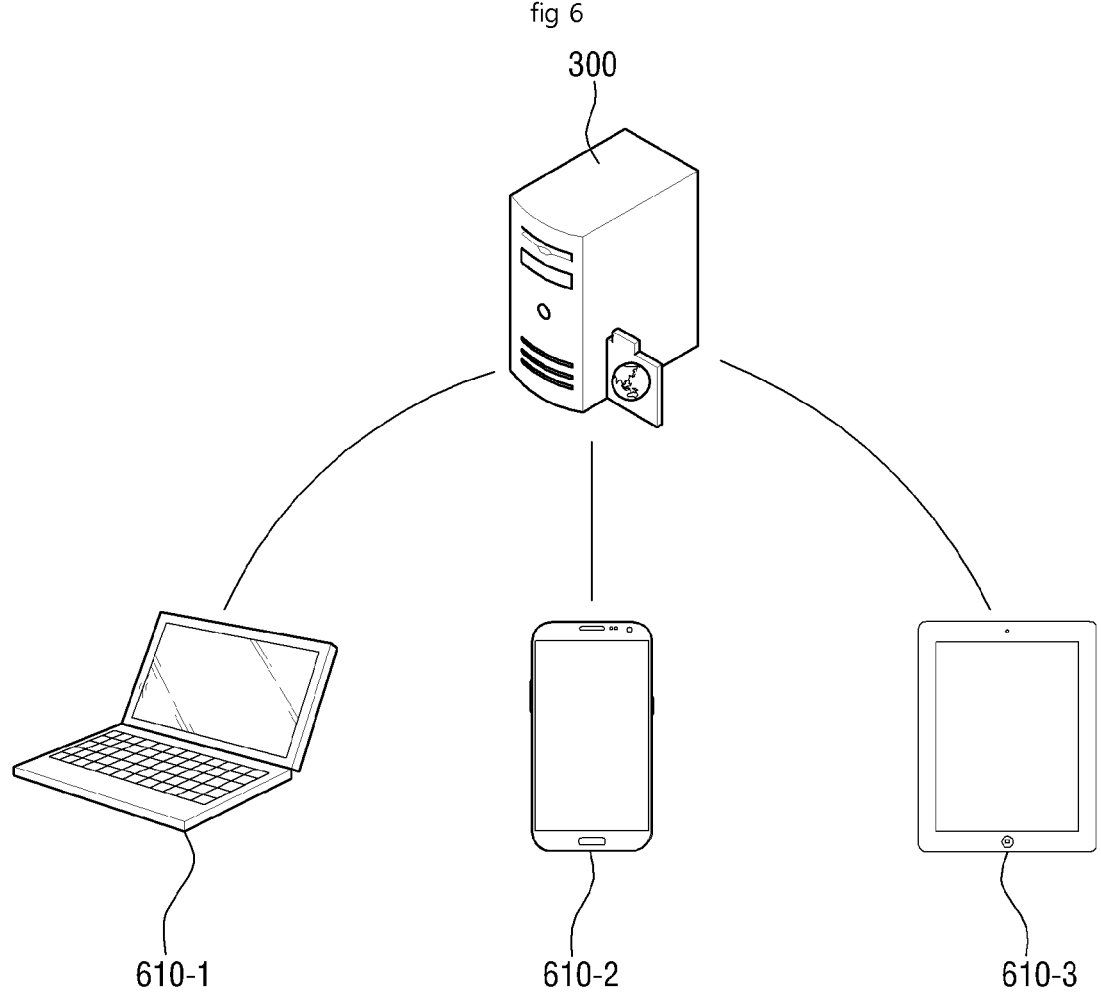
FIG. 6 is a diagram for describing an operation of an MCU gateway 300 according to the embodiment of the present invention.

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

FIG. 1 is a diagram for describing a video conference system 100 according to an embodiment of the present invention.

The video conference system 100 illustrated in FIG. 1 includes an MCU 200, a plurality of terminal devices 210-1, 210-2, . . . , 210-$n$ connected to the MCU 200, an MCU gateway 300, and a plurality of terminal devices 310-1, 310-2, . . . , 310-$n$ connected to the MCU gateway 300.

The MCU 200 receives a video signal and an audio signal from the plurality of terminal devices 210-1 and 210-2 connected to a physical port and mixes the received video and audio signals with one audio video signal and transmits the mixed audio and video signal to each terminal device again.

The terminal devices 210-1, 210-2, 310-1, 310-2, and 310-3 may be various electronic devices including a communication module which may be connected with the MCU gateway 300 in a wired/wireless method, and a microphone and a camera for receiving speaking contents from the participants. For example, the terminal devices 210-1, 210-2, 310-1, 310-2, and 310-3 may be any one of various devices including a smart phone, a video phone, a tablet PC, a notebook PC, a desktop PC, a hologram display, and the like.

The MCU 200 is connected even with the MCU gateway 300 through one physical port to receive at least one of the video and audio signals input into one terminal 310-1, 310-2, or 310-3 among the terminal devices 310-1, 310-2, and 310-3 connected to the MCU gateway 300. Therefore, the participants who participate in the video conference may receive at least one of video and audio signals of participants directly connected with the MCU 200 and at least one of audio and video signals for one participant among participants connected with the MCU gateway 300.

The MCU gateway 300 according to the embodiment of the present invention is connected with the MCU 200 through one physical port and connected with the plurality of terminal devices 310-1, 310-2, and 310-3 through a wired or wireless network.

The MCU gateway 300 selects one terminal device among the plurality of terminal devices 310-1, 310-2, and 310-3 connected through the network by using level information of a sound signal input into the microphone provided in the terminal devices 310-1, 310-2, and 310-3 and receives the speaking contents from the selected terminal device. Herein, the speaking contents means at least one of an audio signal and a video signal thereof of a participant input from a terminal device of a participant determined as a speaker. That is, the speaking contents may be audio or video, or include only audio or video. According to some embodiments, the speaking contents may also include data for forming a hologram video.

That is, the MCU gateway 300 does not transmit video and audio signals input into all of the terminal devices 310-1, 310-2, and 310-3 connected with the MCU gateway 300 through the network to the MCU 200 but transmits the speaking contents input into one terminal device determined as the speaker by the MCU gateway 300 to the MCU 200.

Further, users of the plurality of terminal devices 310-1, 310-2, and 310-3 connected with the MCU gateway 300 through the network may receive speaking contents of users of other terminal devices 210-1 and 210-2 connected with the MCU 200 through the MCU gateway 300.

The MCU 200 and the MCU gateway 300 are connected to each other through one physical port as illustrated in FIG. 1, and the plurality of terminal devices 310-1, 310-2, and 310-3 are connected with the MCU gateway 300 through wired and wireless networks, and as a result, it is possible to achieve an effect in which a plurality of conference participants may be connected to one MCU 200 port.

Since the MCU gateway 300 receives the speaking contents from one terminal device determined as the speaker and transmits the received speaking contents to the MCU 200, a plurality of users may be allowed to participate in the conference even though a lot of network resources are not secured in order for all the users to receive the speaking contents from the plurality of terminal devices.

FIG. 2 is a block diagram for describing a configuration and an operation of the MCU gateway 300 according to the embodiment of the present invention.

Only components of the MCU gateway 300 related with the embodiment is illustrated in FIG. 2. Therefore, those skilled in the art related with the embodiment will understand that other general components other than the components illustrated in FIG. 2 may be further included. Further, the MCU gateway 300 according to the embodiment of the present invention is connected with the MCU 200 through one port and connected with the plurality of terminal devices through the wired/wireless network.

The MCU gateway 300 illustrated in FIG. 2 includes a communication unit 310 and a speaker determining unit 330.

The communication unit 310 is connected with one or more terminal devices and receives signal level information of sound input into the microphone provided in one or more terminal devices from one or more terminal devices.

Since the communication unit 310 does not receive sound data itself, which is input through the microphone but receives only sound magnitude information, an unnecessary load may be prevented from being applied to the network connected with the MCU gateway 300 and the plurality of terminal devices.

The speaker determining unit 330 selects one of the terminal devices connected with the communication unit 310 as a speaking terminal device based on the signal level information received by the communication unit 310. Herein, the speaking terminal device means a terminal device into which the speaking contents are input from the user by applying a speaking right to the user of the speaking terminal device.

According to the embodiment of the present invention, the speaker determining unit 330 may select the terminal device into which sound having a signal level of a predetermined magnitude or more is input as the speaking terminal device.

When the user with the speaking right starts speaking, voice of the user is input into the terminal device, and as a result, signal level information indicating a sound level with a predetermined magnitude or more is received by the communication unit 310. Therefore, the speaker determining unit 330 selects the terminal device into which a sound signal level of a predetermined magnitude or more is input as the speaking terminal device.

Thereafter, the speaker determining unit 330 transmits a signal for requesting the terminal device selected as the speaking terminal device to transmit the speaking contents. Herein, the speaking contents may be one of the audio signal of the user or the video signal of the user input into the speaking terminal device.

That is, the MCU gateway 300 transfers only the speaking contents received from the terminal device determined as the speaker to the MCU 200by applying the speaking right among the plurality of terminal devices connected to the MCU gateway 300 and residual terminal devices do not receive the speaking contents.

Accordingly, it is possible to achieve an effect in which the MCU gateway 300 is connected with the MCU 200 through one port, and as a result, the plurality of users may be allowed to participate in the conference.

It is possible to achieve an effect in which although the MCU gateway 300 is connected with the plurality of terminal devices, the speaking contents such as the video signal and the audio signal are received from only the speaking terminal device determined as the speaker, and as a result, a lot of network resources are not required.

Meanwhile, the communication unit 310 that receives the speaking contents from the speaking terminal device transmits the speaking contents to the MCU 200 without performing a mixing process of the speaking contents. Further, the MCU gateway 300 may receive video signals or audio signals of other participants transmitted from the MCU 200 and transmit the received video or audio signals to other terminal devices connected with the MCU gateway 300 again.

FIG. 3 is a signal flowchart for describing the video conference system 100 according to the embodiment of the present invention.

The plurality of terminal devices 310-1 and 310-2 connected with the MCU gateway 300 through the network transmit the signal level information of the sound input from the microphone provided in the terminal device to the MCU gateway 300 (S310). When the speaking right is applied to a user of one terminal device among the plurality of terminal devices, and as a result, the user starts speaking, the sound signal level will increase and when not so, signal level information of general noise will be transmitted.

The MCU gateway 300 determines the speaking terminal device by using the sound signal level information received from the terminal devices 310-1 and 310-2. According to the embodiment of the present invention, the MCU gateway 300 may select the terminal device into which a sound signal level having a predetermined magnitude or more is input as the speaking terminal device (S320).

In the embodiment, it has been described that when the sound signal level input into the terminal device has the predetermined magnitude or more, the corresponding terminal device is selected as the speaking terminal device, but the present invention is not limited thereto and a terminal device into which a highest sound signal level is input among the plurality of terminal devices may be selected as the speaking terminal device.

Thereafter, the MCU gateway 300 transmits a signal for requesting the terminal device 310-1 selected as the speaking terminal device to transmit the speaking contents input into the terminal device 310-1 to the MCU gateway 300 (S330).

The terminal device 310-1 that receives the request signal transmits the speaking contents such as an audio signal or a video signal of a user determined as the speaker to the MCU gateway 300 (S340). Further, the MCU gateway 300 that receives the speaking contents transmits the received speaking contents to the MCU 200 again (S350).

As described above, when the MCU gateway 300 determines which terminal device is the speaking terminal device while being connected with the plurality of terminal devices through the network and the MCU gateway 300 transmits only the audio signal and the video signal of the participant input into the speaking terminal device to the MCU 200, the plurality of users may be allowed to participate in the conference through one MCU (200) port.

Since a high-cost MCU 200 need not be additionally installed in order to allow users which are equal to or more than ports provided in the MCU 200, it is possible to save a server capacity and cost.

Meanwhile, the MCU gateway 300 does not receive the audio signals and the video signals from all terminal devices connected through the network but receives only the signal level information of the sound input into the microphone provided in the terminal device and thereafter, only when a specific terminal device is determined as the speaker, the MCU gateway 300 receives the speaking contents from the terminal device, and as a result, a lot of network resources are not required.

FIG. 4 is a diagram for describing a process of withdrawing selection of a speaking terminal device according to the embodiment of the present invention.

In the embodiment, a state in which terminal device 1 310-1 is selected as the speaking terminal device to transmit speaking contents which are an audio signal and a video signal input from the speaker to the MCU gateway 300 will be described as an example.

The MCU gateway 300 transmits the speaking contents received from the terminal device 1 310-1 (S410) to the MCU 200. The MCU 200 mixes speaking contents of participants received from the MCU gateway 300 and other terminal devices with one video and audio signal (S430) and thereafter, provides the mixed video and audio signal to other terminal device connected through the physical port (S440). Further, the MCU gateway 300 that receives the mixed video and audio signal from the MCU 200 also provides the received mixed video and audio signal to terminal devices connected through the wired/wireless network (S450).

Meanwhile, the MCU gateway 300 provides the speaking contents to the terminal devices connected in a wired/wireless method and senses whether a speaking right collection event occurs (S460).

Herein, the speaking right collection event means an event in which a user of a terminal device selected as the speaking terminal device ends speaking, and as a result, the speaking contents are not input any longer. When the speaking right collection event occurs, an audio signal and a video signal of a corresponding user need not be provided to other conference participants any longer, and as a result, the MCU gateway 300 transmits a speaking contents stop request signal to the terminal device 310-1 in which the speaking right collection event occurs (S470).

Meanwhile, whether the speaking right collection event occurs in the speaking terminal device may be sensed by various methods. The MCU gateway 300 according to the embodiment of the present invention may sense that the speaking right collection event occurs in the speaking terminal device when a signal level of sound received from the speaking terminal device is less than a predetermined magnitude.

When the speaking of the user of the terminal device determined as the speaker is ended, and as result, no audio signal is input any longer, the signal level of the sound input into the corresponding terminal device decreases. Therefore, the MCU gateway 300 determines that the speaking of the user of the terminal device is fully ended to collect the speaking right when the signal level of the sound received from the speaking terminal device is less than a predetermined magnitude.

However, a participant selected as the speaker may not speak for a predetermined time while the speaking right is applied to one participant. That is, although the user selected as the speaker does not end the speaking, when the user does not temporarily speak, and as a result, the sound signal is not input into the speaking terminal device, the speaking right may be collected by the MCU gateway 300. In order to prevent such a case, when the sound signal level input from the speaking terminal device is equal to or less than a predetermined value and a predetermined time elapses in such a state, the MCU gateway 300 may collect the speaking right.

As described above, when the speaking right is collected only in the case where no sound signal is input for a predetermined time or more, the collection of the speaking right may be prevented even though the participant does not completely end the speaking.

Meanwhile, the speaking terminal device 310-1 of which the speaking right is collected stops transmitting the speaking contents according to a request from the MCU gateway 200 (S470) and transmits the sound signal level information input into the terminal device.

FIG. 5 is a diagram for describing a state in which the speaking contents are provided to the conference participants by the method for extending participants of a multilateral (e.g. multiparty) video conference service according to the embodiment of the present invention.

Hereinafter, the case where three physical ports for connecting the terminal device are provided in the MCU 200 and the number of participants who intend to participate in the video conference is 5 will be described as an example.

In a general case, since the participants who intend to participate in the conference are more than the ports provided in the MCU 200, the MCU should have been additionally installed. However, according to the embodiment of the present invention, the MCU gateway 300 is connected to one physical port provided in the MCU and a plurality of participants are connected with the MCU gateway 300 in the wired/wireless method, and as a result, the participants which are more than the number of ports provided in the MCU 200 may be allowed to participate in the conference.

The MCU 200 mixes audio signals and video signals of participants transmitted from the terminal device connected to the MCU 200 to one signal and provides the mixed signal to each of the participants. Accordingly, participants connected to the MCU 200 may verify not only video and audio of the participants but also video and audio of other participants connected with the MCU.

The MCU 200 according to the embodiment receives video and audio signals of a first participant 210-1, a second participant 210-2, and one participant among a plurality of participants connected to the MCU gateway 300 and thereafter, mixes the video and audio signals and provides the mixed signal to the respective participants.

For example, when the first participant is determined as the speaker, video and audio of the first participant may be provided to the second user 210-2 and the users 310-1, 310-2, and 310-3 connected to the MCU gateway 300.

Alternatively, the video of the participant determined as the speaker is provided as a largest screen and videos of participants that are not determined as the speaker, but participate in the conference are combined as small screens to be provided to the respective participants.

However, in the case of the participants connected to the MCU gateway 300, only the audio and video for the participant determined as the speaker may be provided to other participants. In this case, the MCU gateway 300 may receive information on a signal level of sound input into the microphone provided in the terminal device from the terminal device connected in the wired/wireless method and determine a terminal device into which a sound signal level having a predetermined magnitude or more is input as the speaking terminal device.

The MCU gateway 300 transmits a speaking content transmission request to the terminal device determined as the speaking terminal device and receives the speaking contents provided according to the request to provide the video and audio signals of the participant determined as the speaker to other participants.

In FIG. 5, a conference screen is illustrated, in which the terminal device of the third participant 310-1 connected to the MCU gateway 300 is determined as the speaking terminal device, and as a result, a video of the third participant 310-1 is displayed in a largest size and the videos of other participants 210-1 and 210-2 are displayed on the small screens.

According to the embodiment of the present invention, the participants 310-2 and 310-3 that are not determined as the speaker among users connected to the MCU gateway 300 may receive the video and audio signals of other participants, but video and audio signals of the participants 310-2 and 310-3 are not provided to other users not determined as the speaker.

Meanwhile, the users connected to the MCU gateway 300 may simultaneously speak during the conference. That is, sound signal level information having a predetermined magnitude or more may be simultaneously input from two or more terminal devices.

In this case, the MCU gateway 300 according to the embodiment of the present invention may select a terminal device into which signal level information having a largest magnitude is input as the speaking terminal device and transmit a signal for requesting the terminal device to transmit the speaking contents.

In the embodiment, a photo of the third participant 310-1 determined as the speaker and the videos of other participants 210-1 and 210-2 are together displayed, but the present invention is not limited thereto and only the video of the participant determined as the speaker may be displayed.

As described above, when the MCU gateway 300 is used and the video and the audio of the participant determined as the speaker are provided, participants which are more than the number of ports provided in the MCU 200 may be allowed to participate in the video conference without additionally installing the MCU 200.

FIG. 6 is a diagram for describing an operation of the MCU gateway 300 according to the embodiment of the present invention.

The MCU gateway 300 according to the embodiment of the present invention may relay the video conference among the terminal devices connected to the MCU gateway 300 without interworking with the MCU 200.

The MCU gateway 300 may be connected with various types of terminal devices 610-1, 610-2, and 610-3 in the wired/wireless method as illustrated in FIG. 6.

The MCU gateway 300 according to the embodiment of the present invention may receive speaking contents from a speaking terminal device determined as the speaker among the plurality of terminal devices 610-1, 610-2, and 610-3 connected in the wired/wireless method and provide the received the speaking contents to other terminal devices.

In detail, the MCU gateway 300 may receive information on a signal level of sound input into a microphone provided in the terminal device from the plurality of terminal devices 610-1, 610-2, and 610-3 and select a terminal device into which a sound signal having a predetermined magnitude or more is input as the speaking terminal device.

When the speaking terminal device is selected, the MCU gateway 300 may request the terminal device to transmit the speaking contents to and receive the speaking contents and provide the received speaking contents to other terminal devices.

However, as a sound signal having a predetermined magnitude ore more is temporarily input due to noise, and the like, the terminal device may be selected as the speaking terminal device even though the terminal device is not the speaker. Accordingly, the MCU gateway 300 according to the embodiment of the present invention may select as the speaking terminal device a terminal device into which a sound signal having a predetermined magnitude or more is input for a predetermined time or more.

As described above, when one terminal device among the plurality of terminal devices connected in the wired/wireless method is selected as the speaking terminal device and the speaking contents are received from only the terminal device, even though resources of a network connected with the MCU gateway 300 and the terminal device are not sufficient, the plurality of participants may be allowed to participate in the video conference.

The video signal and the audio signal received from the speaking terminal device determined as the speaker are provided to other terminal devices without mixing video signals and audio signals simultaneously input from the plurality of terminal devices to one signal, and as a result, the MCU gateway 300 may be implemented at low cost.

Meanwhile, when the speaker is changed, the MCU gateway 300 according to the embodiment of the present invention senses the change of the speaker to change the speaking terminal device.

For example, when the participant determined as the speaker completely ends the speaking, the sound signal is not input into the terminal device any longer. Therefore, the MCU gateway 300 according to the embodiment of the present invention may cancel the selection of the corresponding terminal device as the speaking terminal device when the level of the sound signal input into the speaking terminal device is less than a predetermined magnitude.

However, in this case, even when the speaker does not completely end the speaking but temporarily stops the speaking, the selection of the terminal device as the speaking terminal device may be cancelled.

Accordingly, the MCU gateway 200 according to the embodiment of the present invention may cancel the selection of the terminal device as the speaking terminal device only when a sound signal having a magnitude which is less than a predetermined magnitude is input for a predetermined time or more.

As described above, when only the speaking contents of the participant determined as the speaker are received and transmitted to other terminal devices, the plurality of participants may be allowed to participate in the video conference without needing a lot of network resources.

Figure 7:
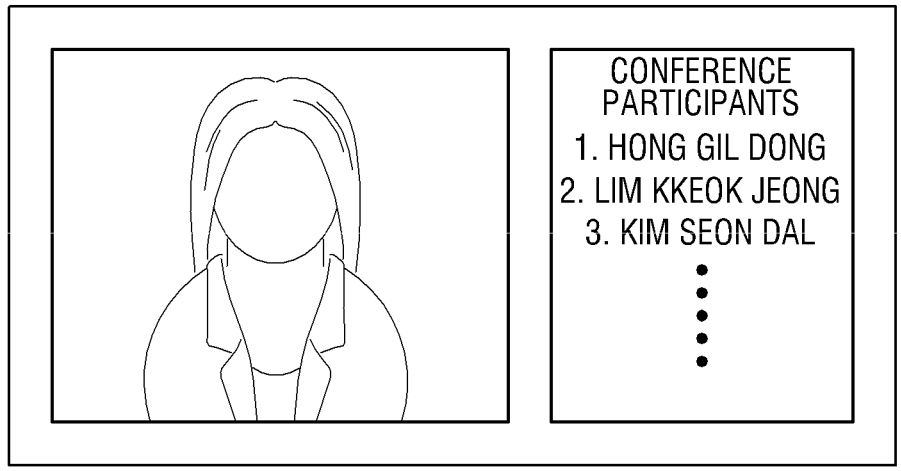
FIG. 7 is an exemplary diagram of a video conference screen provided according to the embodiment of the present invention.

FIG. 7 is a diagram for describing a video conference screen according to the embodiment of the present invention.

In the embodiment, when the MCU gateway 300 does not interwork with the MCU 200, only the video of the user determined as the speaker may be displayed as illustrated in FIG. 7. In this case, a list of participants that participate in the conference at present may be displayed in a partial area of the screen.

In the embodiment, only the video of the user determined as the speaker is displayed, but when the resources of the network connected with the MCU gateway 300 and the plurality of terminal devices are sufficient, videos of all the participants may be displayed.

In this case, the video of the participant determined as the speaker is displayed in a larger size than those of other participants and videos of participants having no speaking right may be displayed as the small screens.

Figure 8:
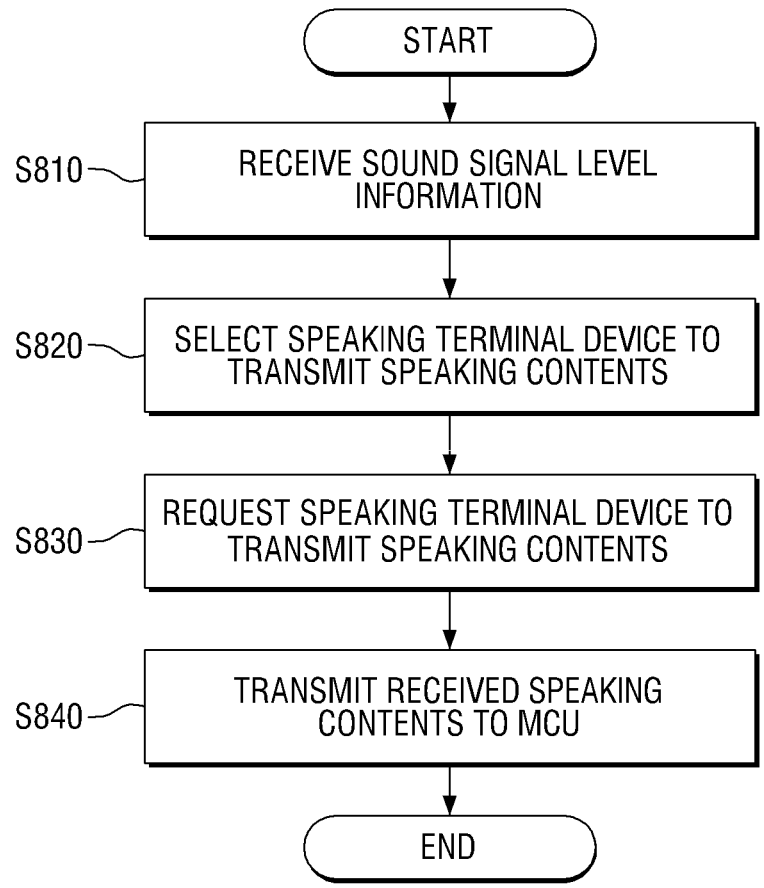
FIG. 8 is a flowchart of a method for extending participants of a multilateral video conference service according to the embodiment of the present invention.

FIG. 8 is a flowchart for describing the method for extending participants of a multilateral video conference service according to the embodiment of the present invention.

In the embodiment, the case in which the MCU gateway 300 is connected with the MCU 200 through one physical port and a plurality of participant terminal devices are connected with the MCU gateway 300 in the wired/wireless method is described as an example.

The MCU gateway 300 receives level information of a sound signal input into a microphone provided in a terminal device, from the plurality of terminal devices connected in the wired/wireless method (S810). The level information of the sound signal means magnitude information of the audio signal input through the microphone.

Since the sound signal level information has a smaller data amount than sound signal data, there is an advantage that a lot of network resources are not required even though the plurality of terminal devices are connected to the MCU gateway 300.

The MCU gateway 300 that receives the signal level information of the sound selects the speaking terminal device based on the received signal level information (S820). Herein, the speaking terminal device means a terminal device into which the participant determined as the speaker inputs the speaking contents.

In detail, the MCU gateway 300 according to the embodiment of the present invention may select the terminal device into which a sound signal having a predetermined magnitude or more is input as the speaking terminal device. However, in order to prevent the terminal device from being selected as the speaking terminal device due to temporary input of the sound signal having the predetermined magnitude or more due to noise, and the like even though a terminal device is not selected as the speaker, a terminal device into which the sound signal having the predetermined magnitude or more is input for a predetermined time or more may be selected as the speaking terminal device (S830).

When the speaking terminal device is selected as described above, the MCU gateway 300 may transmit a signal for requesting the terminal device selected as the speaking terminal device to transmit the speaking contents (S840).

The MCU gateway 300 that receives the speaking contents transmits the received speaking contents to other terminal devices (S850) to allow the conference participant to verify the video signal and the audio signal of the speaker.

As described above, when the terminal device of the participant selected as the speaker is selected as the speaking terminal device and the speaking contents input into the terminal device are received and provided to other terminal devices, even though the resources of the network connected with the MCU gateway 300 and the terminal device are not sufficient, the plurality of participants may be allowed to participate in the conference.

Since video and audio signals input from the plurality of users need not be mixed to one signal, a lot of resources are not required in the MCU gateway 300 itself, thereby achieving an effect to save cost.

Figure 9:
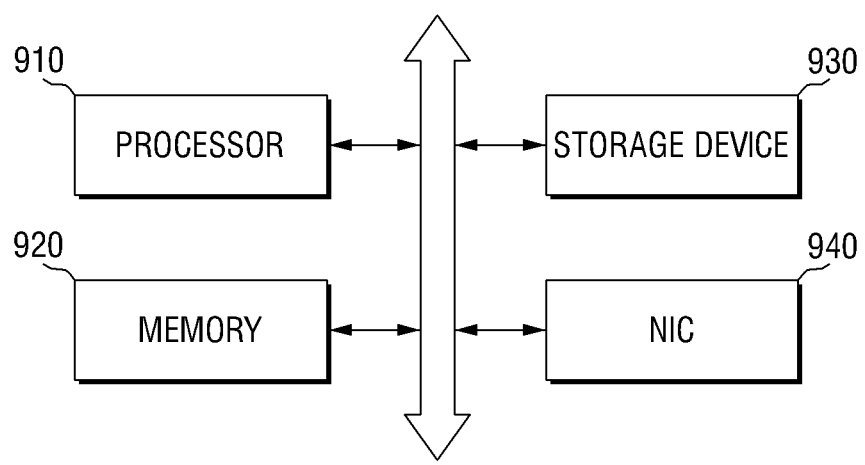
FIG. 9 is a hardware configuration diagram of an MCU gateway according to the embodiment of the present invention.

FIG. 9 is a diagram for describing an MCU gateway 900 according to an embodiment of the present invention.

The MCU gateway 900 according to another embodiment of the present invention may include components illustrated in FIG. 9.

In detail, the MCU gateway 900 may include a processor 910 that executes a command, a memory 920, a storage device 930 that stores a program for executing a method for extending participants in a multilateral video conference service, and a network interface (NIC) 940 for transmitting and receiving data to and from a device connected with the MCU gateway 900.

A program may be stored in the storage device 930, which may execute the steps of receiving, an MCU gateway connected with an MCU and a plurality of terminals, signal level information of sound sensed by microphones provided in the plurality of terminal devices from the plurality of terminal devices, respectively, selecting, by the MCU gateway, one terminal device among the plurality of terminal devices as a speaking terminal device based on the received signal level, requesting, by the MCU gateway, the speaking terminal device to transmit speaking contents input into the speaking terminal device, and transmitting, by the MCU gateway, the speaking contents received from the speaking terminal device in response to the transmission request to the MCU.

Meanwhile, the method may be created by a computer executable program and implemented in a general use digital computer which operates the program using a computer readable recording medium. Further, a structure of data used in the method may be recorded in computer-readable media through various means. The computer readable recording media include a storing medium such as a magnetic storage medium (for example, a ROM, a floppy disk, and a hard disk), and an optical reading medium (for example, CD-ROM, a DVD).

The foregoing is illustrative of the present invention and is not to be construed as limiting thereof. Although a few embodiments of the present invention have been described, those skilled in the art will readily appreciate that many modifications are possible in the embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A method for expanding participants of a multiparty video conference service into a number of ports which are more than provided in an MCU by a multipoint conference unit (MCU) gateway, the method comprising:

physically connecting the MCU gateway with an MCU through a physical port, wherein the MCU gateway is connected with a first plurality of terminal devices in a wired or wireless manner;

first receiving, by the MCU gateway, a sound signal level of each of the first plurality of terminal devices sensed by microphones provided in the first plurality of terminal devices, respectively, thereby receiving a plurality of sound signal levels, the sound signal level indicating only a sound magnitude without speaking contents;

selecting, by the MCU gateway, one terminal device among the first plurality of terminal devices as a speaking terminal device based on the plurality of sound signal levels;

requesting, by the MCU gateway, the speaking terminal device to transmit speaking contents input into the speaking terminal device;

second receiving, by the MCU gateway, the speaking contents only from the selected speaking terminal device, in response to the request to the selected speaking terminal device; and transmitting, by the MCU gateway, the received speaking contents which is transmitted to a second plurality of terminal devices connected with the MCU, through the physical port.

2. The method of claim 1, wherein the selecting of the speaking terminal device comprises selecting a terminal device into which a sound signal level having a predetermined magnitude or more is input as the speaking terminal device.

3. The method of claim 2, wherein the selecting of the speaking terminal device further comprises selecting, when the first plurality of terminal devices into which sound signal levels having the predetermined magnitude or more are input are provided, a terminal device in which a highest magnitude of sound signal level is input as the speaking terminal device.

4. The method of claim 1, wherein the selecting the speaking terminal device comprises selecting the one terminal device as the speaking terminal device when the sound signal level having the predetermined magnitude or more is input for a predetermined time or more into the one terminal device.

5. The method of claim 1, further comprising:
third receiving the sound signal level input into the speaking terminal device;
cancelling the selection of the one terminal device as the speaking terminal device when a magnitude of the sound signal level input into the speaking terminal device is less than the predetermined magnitude; and
transmitting a request for stopping transmitting the speaking contents to the cancelled speaking terminal device.

6. The method of claim 1, further comprising:
cancelling the selection of the one terminal device as the speaking terminal device when a sound signal is not input into the speaking terminal device for a predetermined time or more; and
transmitting a request for stopping transmitting a video signal and an audio signal to the cancelled speaking terminal device.

7. The method of claim 1, further comprising:
receiving mixed video and audio signals from the MCU through the physical port; and
transmitting the received mixed video and audio signals to the first plurality of terminal devices connected through a network.

8. A multipoint conference unit (MCU) gateway connected with a first plurality of terminal devices through a network, the MCU gateway being configured to set a session between the first plurality of terminal devices and the MCU, the MCU gateway comprising:

a physical port configured to be physically connected with an MCU;

a communication unit configured to firstly receive a sound signal level of each of the first plurality of terminal devices sensed through microphones provided in the terminal devices, respectively, thereby receiving a plurality of sound level signals, the sound signal level indicating only a sound magnitude without speaking contents; and a speaker determining unit configured to select one terminal device among the first plurality of terminal devices as a speaking terminal device based on the plurality of sound signal levels, and to request the speaking terminal device to transmit speaking contents through the communication unit, wherein the communication unit configured to:
secondly receives the speaking contents only from the selected speaking terminal device, in response to the request to the selected speaking terminal device; and
transmits the received speaking contents which is transmitted to a second plurality of terminal devices connected with the MCU, through the physical port.

9. The MCU gateway of claim 8, wherein the speaker determining unit selects a terminal device into which a sound signal level having a predetermined magnitude or more is input as the speaking terminal device.

10. The MCU gateway of claim 9, wherein the speaker determining unit selects, when the first plurality of terminal devices into which sound signal levels having the predetermined magnitude or more are input are provided, a terminal device into which a sound signal level having a largest magnitude is input as the speaking terminal device.

11. The MCU gateway of claim 8, wherein the speaker determining unit selects the one terminal device into which a sound signal level having the predetermined magnitude or more is input for a predetermined time or more as the speaking terminal device.

12. The MCU gateway of claim 8, wherein the speaker determining unit cancels the selection of the one terminal device as the speaking terminal device when a magnitude of the sound signal level input into the speaking terminal device is less than the predetermined magnitude, and
the communication unit transmits a request for stopping transmitting the speaking contents to the one terminal device which is subject to cancellation of the selection as the speaking terminal device.

13. The MCU gateway of claim 8, wherein the speaker determining unit cancels the selection of the one terminal device as the speaking terminal device when a sound signal is not input into the speaking terminal device for a predetermined time or more, and
the communication unit transmits a request for stopping transmitting the speaking contents to the one terminal device which is subject to cancellation of the selection as the speaking terminal device.

14. The MCU gateway of claim 8, wherein the communication unit thirdly receives mixed video and audio signals from the MCU and transmits the mixed video and audio signals to the first plurality of terminal devices connected through a network, respectively.

15. A computer program, for expanding participants of a multiparty video conference service into a number of ports which are more than provided in an MCU by a multipoint conference unit (MCU) gateway, coupled with a computer device and stored in a non-transitory computer readable recording medium, the program being configured to execute:

first receiving, by the MCU gateway connected with an MCU through at least one physical port and connected with a first plurality of terminal devices in a wired or wireless manner, a sound signal level of each of the first plurality of terminal devices sensed by microphones provided in the first plurality of terminal devices, respectively, thereby receiving a plurality of sound signal levels, the sound signal level indicating only a sound magnitude without speaking contents;

selecting, by the MCU gateway, one terminal device among the first plurality of terminal devices as a speaking terminal device based on the plurality of sound signal levels;

requesting, by the MCU gateway, the speaking terminal device to transmit speaking contents input into the speaking terminal device;

secondly receiving, by the MCU gateway, the speaking contents only from the selected speaking terminal device, in response to the request to the selected speaking terminal device; and transmitting, by the MCU gateway, the received speaking contents which is transmitted to a second plurality of terminal devices connected with the MCU through the physical port, wherein the MCU gateway is physically connected with the MCU through the physical port.

* * * * *